(12) United States Patent  (10) Patent No.: US 8,015,445 B2
Ando  (45) Date of Patent: Sep. 6, 2011

(54) FAULT LOCATION DEVICE, COMMUNICATION DEVICE, AND FAULT LOCATION METHOD

(75) Inventor: Hiroya Ando, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 270 days.

(21) Appl. No.: 12/349,051

(22) Filed: Jan. 6, 2009

(65) Prior Publication Data

US 2009/0183033 A1    Jul. 16, 2009

(30) Foreign Application Priority Data

Jan. 10, 2008    (JP) ................................. 2008-003101

(51) Int. Cl.
*G06F 11/00*    (2006.01)
(52) U.S. Cl. .......................................... 714/25; 714/43
(58) Field of Classification Search .................. None
See application file for complete search history.

(56) References Cited

U.S. PATENT DOCUMENTS

| | | | |
|---|---|---|---|
| 5,765,031 A | 6/1998 | Mimuth et al. | |
| 6,442,708 B1 | 8/2002 | Dierauer et al. | |
| 2002/0083378 A1* | 6/2002 | Nickels | 714/704 |
| 2006/0146698 A1* | 7/2006 | Ukrainetz et al. | 370/221 |
| 2008/0186870 A1* | 8/2008 | Butts et al. | 370/252 |

FOREIGN PATENT DOCUMENTS

| | | |
|---|---|---|
| DE | 195 03 460 C1 | 3/1996 |
| EP | 1 353 477 A2 | 10/2003 |
| JP | 2003-143164 A | 5/2003 |
| JP | 2006-135375 A | 5/2006 |

OTHER PUBLICATIONS

Robert Bosch GmbH, CAN Specification 2.0, 1991, Part A—p. 24.*

* cited by examiner

*Primary Examiner* — Scott T Baderman
*Assistant Examiner* — Jason Bryan
(74) *Attorney, Agent, or Firm* — Sughrue Mion, PLLC

(57) ABSTRACT

A fault location device detects a communication device connected to a broken communication line from among communication devices that carry out communications between each other through a two-wire communication line. The communication device, when detecting a communication error, stores communication error time and a communication error counter accumulated value indicating accumulated counts of the communication error, changes into a bus off state on the basis of the communication error counter accumulated value, and, after a predetermined period of time, returns from the bus off state. The fault location device includes an acquisition unit that acquires the communication error time and communication error counter accumulated value, stored in each communication device; and a detection unit that detects a communication device connected to a broken communication line on the basis of variations in the communication error counter accumulated values while any one of the communication devices is in a bus off state.

12 Claims, 7 Drawing Sheets

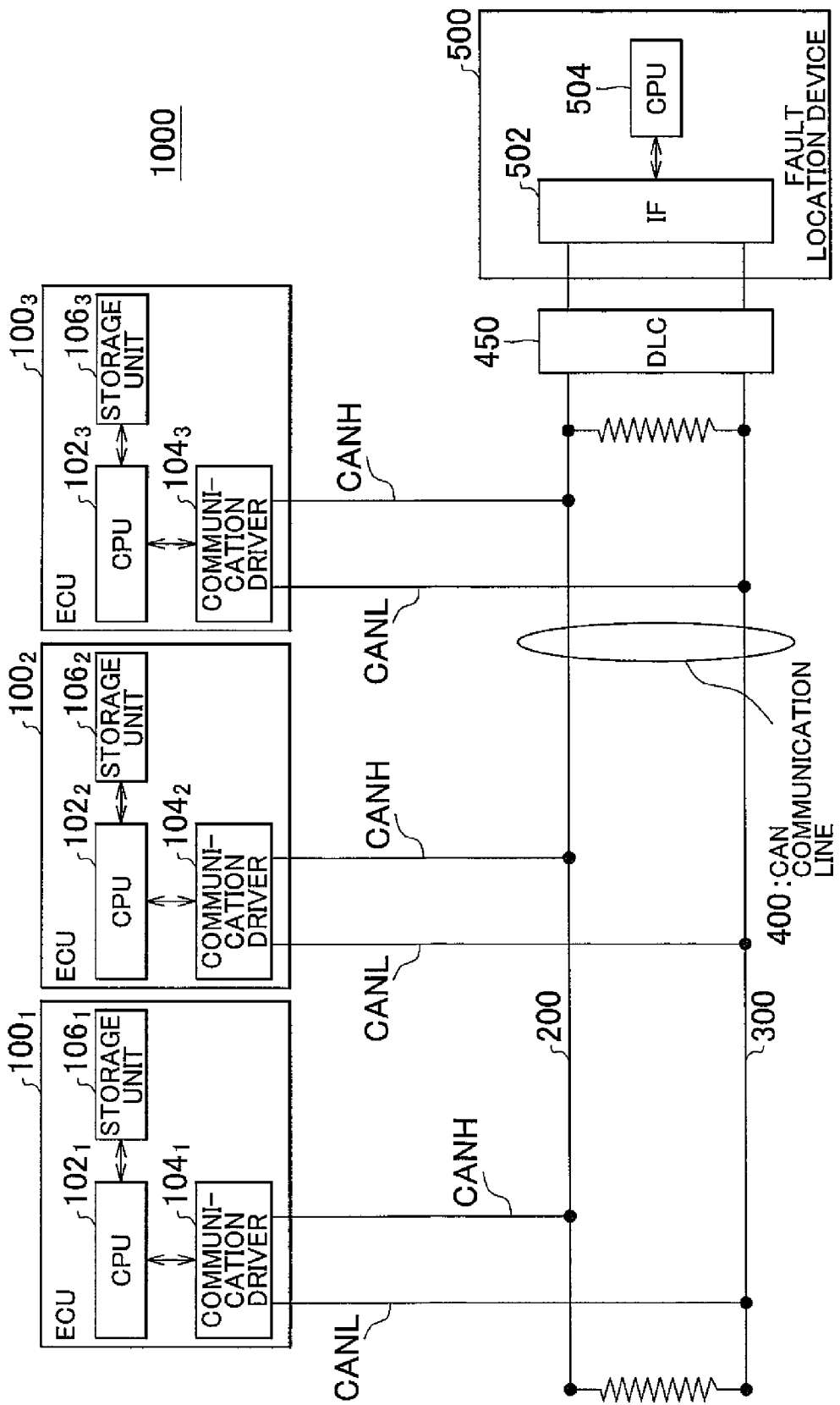

FIG. 2

| CASE 1 ABNORMAL ECU INTERRUPTS DATA TRANSMISSION | | |
|---|---|---|
| ERROR COUNTER OF ABNORMAL ECU | TRANSMISSION ERROR COUNTER | NO INCREASE |
| | RECEPTION ERROR COUNTER | NO INCREASE |
| ERROR COUNTER OF NORMAL ECU | TRANSMISSION ERROR COUNTER | NO INCREASE |
| | RECEPTION ERROR COUNTER | NO INCREASE |
| CASE 2 NORMAL ECU INTERRUPTS DATA TRANSMISSION | | |
| ERROR COUNTER OF ABNORMAL ECU | TRANSMISSION ERROR COUNTER | INCREASE |
| | RECEPTION ERROR COUNTER | NO INCREASE |
| ERROR COUNTER OF NORMAL ECU | TRANSMISSION ERROR COUNTER | INCREASE |
| | RECEPTION ERROR COUNTER | INCREASE |

FIG. 3

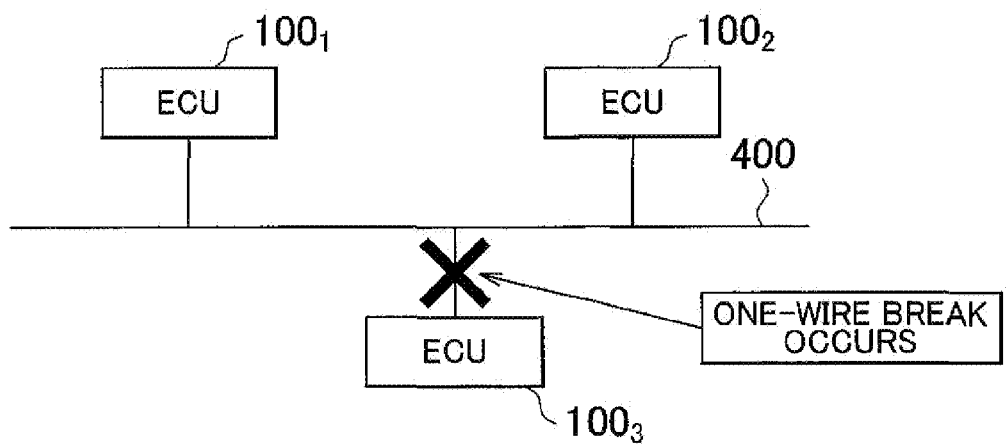

FAULT LOCATION DEVICE, COMMUNICATION DEVICE, AND FAULT LOCATION METHOD

INCORPORATION BY REFERENCE

The disclosure of Japanese Patent Application No. 2008-003101 filed on Jan. 10, 2008 including the specification, drawings and abstract is incorporated herein by reference in its entirety.

BACKGROUND OF THE INVENTION

1. Field of the Invention

The invention relates to a controller area network (CAN) communication system and method by which communications are carried out among a plurality of communication devices connected through a CAN bus and, more particularly, to a fault location device, communication device, and fault location method that are able to identify a fault point due to a one-wire break.

2. Description of the Related Art

A known CAN communication system carries out data communications among a plurality of communication devices. The plurality of communication devices are connected with one another through a CAN bus, and each have a CAN controller unit. The CAN communication protocol allows bidirectional serial communication through a differential serial bus.

In the CAN communication system, each communication device transmits data with its own identification (ID) code to the CAN bus. At the time the communication device transmits the data, when the CAN bus is not occupied by data transmitted from another communication device, the data transmitted from the communication device flows through the CAN bus and reaches an intended communication device. On the other hand, when the CAN bus is occupied by data from another communication device, the data, which will be transmitted from the communication device, is queued in the CAN controller unit. Then, when there is only one communication device in which the data are queued, the queued data flow through the CAN bus when the CAN bus is unoccupied. On the other hand, when there are a plurality of communication devices in which the data are queued, the data of the highest-priority communication device on the basis of the ID code from among those communication devices flow through the CAN bus prior to the other queued data.

The CAN communication system includes the plurality of communication devices (nodes). These plurality of communication devices are connected with one another through the CAN bus which is formed of twisted pair wires. The communication devices transmit and receive data to and from one another. The twisted pair wires of the CAN bus are bus wires, one of which is called CAN High (CANH) and the other one of which is called CAN Low (CANL). The communication devices may be, for example, formed of a plurality of electronic control units (ECUs) that control various portions of a vehicle.

Japanese Patent Application Publication No. 2003-143164 (JP-A-2003-143164), for example, describes a controller that is able to identify another faulty controller (ECU) at the time of intercommunication control. This controller observes a device that transmits and receives data to and from a communication line. The device includes a measurement unit that measures a period of time from the time when the preceding communication data are acquired to the time when the subsequent communication data are acquired, and a determination unit that determines a breakdown of communications when the measured time exceeds a predetermined determination time. When communication data, transmitted from another communication device to the communication line at a minimal communication cycle, are not acquired even when a transmission interval of the communication data exceeds a predetermined determination threshold, it is determined that a breakdown of communications occurs in that transmitting communication device and the device is faulty.

However, the above described related art has the following problems.

In the CAN communication system, when a one-wire break occurs, it is difficult to identify a communication device connected to a communication line in which the one-wire break is occurring. The one-wire break includes a break that occurs in one of communication lines connected to a communication device and a contact failure that occurs in one of the communication lines connected to a communication device. When the one-wire break occurs, it is no problem when the one-wire break continues and then can be repaired; however, there is a possibility that, for example, in the case of a contact failure, the communication line may be apparently connected before the one-wire break is repaired. In this case, the communication line is just apparently connected, so a contact failure occurs again when the communication line is pulled. Thus, a fault point may be identified by pulling the communication line. However, because a vehicle is equipped with several hundreds of communication lines, it is practically impossible to identify the communication device, in which the contact failure is occurring, by pulling the communication lines.

In addition, when a one-side communication line is broken, a communication device connected to the broken communication line generates an abnormal voltage. This corrupts data transmitted from another communication device. As a result, data (message) from a normal communication device are also corrupted. As a consequence of corruption of the message transmitted from the normal communication device, the normal communicable communication device is also determined to be in a breakdown of communications. Thus, the normal communicable communication device is erroneously determined to be faulty.

In the above described JP-A-2003-143164, it is not assumed that one of wires between CANH and CANL is broken. Thus, it is impossible to identify a communication device connected to a wire in a one-wire break.

SUMMARY OF THE INVENTION

The invention provides a fault location device, communication device, and fault location method that are able to detect a communication device in which one of two wires connected to the communication device is broken.

A first aspect of the invention provides a fault location device. The fault location device detects a communication device connected to a broken communication line from among first and second communication devices that carry out communications between each other through a two-wire communication line. When a communication error has been detected, each of the communication devices stores time of the communication error and a communication error counter accumulated value that indicates accumulated counts corresponding to the communication error, changes into a bus off state on the basis of the communication error counter accumulated value and then, after a predetermined period of time has elapsed, returns from the bus off state. The fault location device includes: an acquisition unit that acquires the time of the communication error and the communication error counter accumulated value, which are stored in each of the communication devices; and a detection unit that detects a communication device connected to a broken communication line on the basis of variations in the communication error counter accumulated values while any one of the communication devices is in a bus off state.

With the above configuration, it is possible to detect a communication device connected to a broken communication line on the basis of variations in the communication error counter accumulated values while any one of the communication devices is in a bus off state. The fault location device may be, for example, formed of a service tool.

In the above first aspect, the communication error may include a transmission error and a reception error. Each of the communication devices may store a transmission error counter accumulated value that indicates accumulated counts corresponding to the transmission error and a reception error counter accumulated value that indicates accumulated counts corresponding to the reception error. When there is a communication device whose transmission error counter accumulated value increases and whose reception error counter accumulated value does not increase, the detection unit may determine that a communication line connected to that communication device is broken.

Alternatively, in the first aspect, the communication error may include a transmission error and a reception error. Each of the communication devices may store a transmission error counter accumulated value that indicates accumulated counts corresponding to the transmission error and a reception error counter accumulated value that indicates accumulated counts corresponding to the reception error. When there is no communication device whose transmission error counter accumulated value increases, and when the reception error counter accumulated values of all the communication devices do not increase, the detection unit may determine that a communication line connected to the communication device which is in the bus off state is broken.

With the above configuration, it is possible to detect a communication device connected to a broken communication line on the basis of the transmission error counter accumulated value and the reception error counter accumulated value, which are stored in each of the communication devices.

A second aspect of the invention provides a first communication device in a communication system formed of the first communication device and a second communication device. The first communication device and the second communication device carry out communications between each other through a two-wire communication line. The first communication device includes: a storage unit that stores time of a communication error and a communication error counter accumulated value that indicates accumulated counts corresponding to the communication error; a control unit that changes the first communication device into a bus off state on the basis of the communication error counter accumulated value and then, after a predetermined period of time has elapsed, returns the first communication device from the bus off state; an acquisition unit that acquires the time of the communication error and the communication error counter accumulated value, which are stored in each of the communication devices; and a detection unit that detects a communication device connected to a broken communication line on the basis of variations in the communication error counter accumulated values while one of the first and second communication devices is in a bus off state.

With the above configuration, it is possible to detect a communication device connected to a broken communication line on the basis of variations in the communication error counter accumulated values while one of the first and second communication devices is in a bus off state. The first communication device may be formed of a communication device that has, for example, a master function.

In the above second aspect, the communication error may include a transmission error and a reception error. The storage unit may store a transmission error counter accumulated value that indicates accumulated counts corresponding to the transmission error and a reception error counter accumulated value that indicates accumulated counts corresponding to the reception error. When there is a communication device whose transmission error counter accumulated value increases and whose reception error counter accumulated value does not increase, the detection unit may determine that a communication line connected to that communication device is broken.

Alternatively, in the second aspect, the communication error may include a transmission error and a reception error. The storage unit may store a transmission error counter accumulated value that indicates accumulated counts corresponding to the transmission error and a reception error counter accumulated value that indicates accumulated counts corresponding to the reception error. When there is no communication device whose transmission error counter accumulated value increases, and when the reception error counter accumulated values of all the communication devices do not increase, the detection unit may determine that a communication line connected to the communication device which has been in the bus off state is broken.

With the above configuration, it is possible to detect a communication device connected to a broken communication line on the basis of the transmission error counter accumulated value and the reception error counter accumulated value, which are stored in each of the communication devices.

A third aspect of the invention provides a fault location method for detecting a communication device connected to a broken communication line from among first and second communication devices that carry out communications between each other through a two-wire communication line. The fault location method includes: when a communication error has been detected by the first communication device, storing time of the communication error and a communication error counter accumulated value that indicates accumulated counts corresponding to the communication error; changing the first communication device into a bus off state on the basis of the communication error counter accumulated value and then, after a predetermined period of time has elapsed, returning the first communication device from the bus off state; acquiring the time of the communication error and the communication error counter accumulated value, which are stored in each of the first and second communication devices; and detecting a communication device connected to a broken communication line on the basis of variations in the communication error counter accumulated values of each of the communication devices while one of the first and second communication devices is in a bus off state.

By so doing, it is possible to detect a communication device connected to a broken communication line on the basis of variations in the communication error counter accumulated values while one of the first and second communication devices is in a bus off state. The fault location method may be, for example, executed by a service tool.

In the above third aspect, the communication error may include a transmission error and a reception error. When the time of the communication error and the communication error counter accumulated value are stored, a transmission error counter accumulated value that indicates accumulated counts corresponding to the transmission error and a reception error counter accumulated value that indicates accumulated counts corresponding to the reception error may be stored. When there is a communication device whose transmission error counter accumulated value increases and whose reception error counter accumulated value does not increase, it may be determined that a communication line connected to that communication device is broken.

Alternatively, in the third aspect, the communication error may include a transmission error and a reception error. When the time of the communication error and the communication error counter accumulated value are stored, a transmission error counter accumulated value that indicates accumulated counts corresponding to the transmission error and a reception error counter accumulated value that indicates accumulated counts corresponding to the reception error may be stored. When there is no communication device whose transmission error counter accumulated value increases and when the reception error counter accumulated values of all the communication devices do not increase, it may be determined that a communication line connected to the communication device which is in the bus off state is broken.

By so doing, it is possible to detect a communication device connected to a broken communication line on the basis of the transmission error counter accumulated value and the reception error counter accumulated value, which are stored in each of the communication devices.

According to the above described fault location device, communication device and fault location method, it is possible to detect a communication device in which one of two wires connected to the communication device is broken.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 1 is a view that illustrates a CAN communication system and a fault location device according to a first embodiment of the invention;

FIG. 2 is a view that illustrates an example of a time variation in reception and transmission error counter accumulated values under the condition that there is a communication device that is in a bus off state;

FIG. 3 is a view that illustrates the CAN communication system according to the first embodiment of the invention;

DETAILED DESCRIPTION OF EMBODIMENTS

Figure 4:
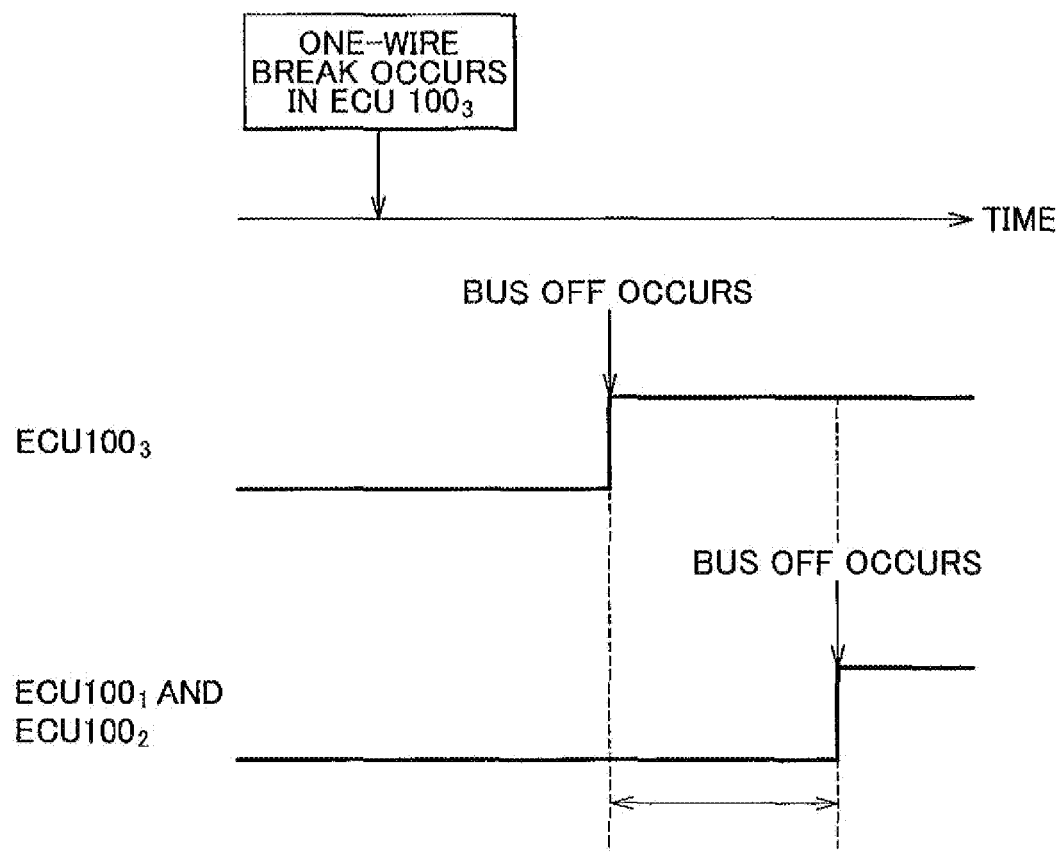
FIG. 4 is a time chart that shows a change into a bus off state of each communication device under the condition that there is a faulty communication device.

Embodiments of the invention will now be described with reference to the accompanying drawings. Note that in all the drawings for illustrating the embodiments, like reference numerals denote like components, and the description thereof will not be repeated.

A CAN communication system according to a first embodiment of the invention will be described with reference to FIG. 1. FIG. 1 also shows a DLC 450 and a fault location device 500. The DLC 450 and the fault location device 500 are connected to the CAN communication system when a fault point is detected.

The CAN communication system 1000 according to the present embodiment, for example, includes a plurality of communication devices that carry out communications in accordance with the communication protocol of an in-vehicle LAN. For example, the communication protocol of the in-vehicle LAN may employ a controller area network (CAN). The communication devices are respectively formed of a plurality of electronic control units (ECUs) that control various portions of a vehicle.

In the CAN, as described above, a communication line (communication bus) uses a two-wire CAN communication line 400 formed of a CANH 200 and a CANL 300, and a terminator is connected at each end of the two-wire CAN communication line 400. Then, in the CAN, a transmitting communication device transmits inverted signals to the CANH 200 and the CANL 300, and a receiving communication device determines, on the basis of a voltage difference between the CANH 200 and the CANL 300, whether a piece of data on the CAN communication line 400 is "1" or "0".

Each of the ECUs $100_1$ to $100_3$ includes a CPU 102 ($102_1$, $102_2$, and $102_3$), a communication driver 104 ($104_1$, $104_2$, and $104_3$), and a storage unit 106 ($106_1$, $106_2$, and $106_3$). Each CPU 102 executes a control process for controlling various portions of the vehicle and a process for carrying out communications with another ECU. Each communication driver 104 is connected to the above described two-wire CAN communication line 400. Each communication driver 104 outputs transmission data, transferred from the CPU 102, to the two-wire CAN communication line 400, and inputs data on the two-wire CAN communication line 400 into the CPU 102. Each storage unit 106 stores a communication error detected by the CPU 102. The communication error includes a transmission error and a reception error.

Each communication driver 104 includes first and second output buffers (two output buffers) and a binarization circuit. For example, the first output buffer sets the voltage of the CANH 200 to a high level (for example, 3.5 V) when the transmission data is "0", or sets the voltage of the CANH 200 to a low level (for example, 2.5 V) when the transmission data is "1". The second output buffer sets the voltage of the CANL 300 to a low level (for example, 1.5 V) when the transmission data is "0", or sets the voltage of the CANL 300 to a high level (for example, 2.5 V) when the transmission data is "1". The binarization circuit generates a binary signal "1" or "0" that indicates the data on the CAN communication line 400 on the basis of a difference between a voltage input to the CANH 200 and a voltage input to the CANL 300.

In each of the ECUs $100_1$ to $100_3$, the CPU 102 monitors the condition of CAN communication and detects a communication error. For example, the CPU 102 monitors the condition of CAN communication and detects a reception error and/or a transmission error as the communication error. The communication error includes any one of a bit error, a stuff error, a cyclic redundancy check (CRC) error, a form error, and an authentication error. The communication device, which transmits data, monitors the bus at the same time. The bit error is detected when a monitoring bit is different from a transmitted bit. The stuff error is detected when successive six bits have the same bit level against a bit-stuffing rule. A CRC sequence contains a CRC calculation result calculated in a transmitter. The CRC error is detected when a receiver calculates a CRC and the calculated CRC is different from the above CRC calculation result. The form error is detected when a field whose number of bits is fixed contains an invalid bit. The authentication error is detected by the transmitter when an ACK slot from a receiver does not return a dominant bit.

The CPU 102 updates an error counter value, which is determined beforehand in correspondence with a communication error, in accordance with the detected communication error. For example, the CPU 102 detects a transmission error and/or a reception error, increases a transmission error counter value (TEC), corresponding to the transmission error, and/or a reception error counter value (REC), corresponding to the reception error, and then obtains a transmission error counter accumulated value and/or a reception error counter accumulated value. The transmission error counter accumulated value represents accumulated counts corresponding to the transmission error. The reception error counter accumulated value represents accumulated counts corresponding to the reception error. Then, the CPU 102 determines to enter a state called bus off when the transmission error counter accumulated value is larger than or equal to a predetermined transmission error counter accumulated value at which it is assumed to influence communications of the other ECUs 100. The bus off is a function by which the communication device interrupts data transmission by itself and isolates itself from the bus when the number of transmission errors is larger than or equal to a prescribed number of counts and then, after it is confirmed that the bus idle state continues for a predetermined period of time, returns to a normal state. In this bus off state, data reception is allowed. When an ECU connected to a one-wire-broken communication line enters a bus off state, no abnormal voltage is transmitted from the one-wire-broken ECU and, therefore, the other ECUs are not adversely influenced. Thus, it is possible to allow communications among the other ECUs. In addition, each of the CPUs 102 of the other ECUs monitors the condition of communications of the local ECU. Specifically, the CPU 102 of each ECU records communication errors. More specifically, the CPU 102 records a variation in transmission error counter value in the storage unit 106. For example, when the CPU 102 detects a communication error, the CPU 102 records a detection time at which the communication error is detected, and adds an error counter value, corresponding to the transmission error and/or the reception error and included in the communication error, to the transmission error counter accumulated value and/or the reception error counter accumulated value. In addition, the CPU 102 initiates communications after a predetermined period of time has elapsed since the CPU 102 enters a bus off state.

The fault location device according to the embodiment of the invention will be described.

The fault location device 500 according to the present embodiment is connected to the CAN communication system 1000 through the data link connector (DLC) 450. The fault location device may be formed of an external fault determination tool. The fault determination tool includes a diagnostic tool of a service department. The fault location device 500 includes an interface (I/F) 502 and a CPU 504. The CPU 504 serves as an acquisition unit and a detection unit.

The interface 502 receives the detection time of each of the transmission and reception errors and the transmission and reception error counter accumulated values, which are stored in the storage unit 106 of each ECU 100. The detection time of each of the transmission and reception errors and the transmission and reception error counter accumulated values are input to the CPU 504.

The CPU 504 detects a faulty ECU on the basis of the transmission and reception error counter accumulated values input through the interface 502. For example, when an ECU enters a bus off state and interrupts data transmission and then returns from the bus off state after a predetermined period of time has elapsed, the transmission and reception error counter accumulated values of that ECU and the other ECUs vary as shown in FIG. 2.

The bus off state is classified into two cases. The first bus off state is due to a fault of the local ECU. The second bus off state is due to interruption of data transmission of the local ECU, caused by data transmitted from another faulty ECU, even when the local ECU is normal. As shown in FIG. 2, CASE 1 corresponds to the first bus off state, and CASE 2 corresponds to the second bus off state.

According to FIG. 2, when a broken communication line is connected to an ECU that enters a bus off state, the transmission and reception error counter accumulated values of the bus-off ECU both do not increase, that is, both remain constant. This is because a faulty ECU itself is in a bus off state and interrupts data transmission. In addition, when a broken communication line is connected to an ECU that enters a bus off state, the transmission and reception error counter accumulated values of the other ECUs, that is, the ECUs that normally operate, both do not increase, that is, both remain constant. This is because the ECU connected to a broken communication line is in a bus off state and interrupts data transmission and, therefore, the other normal ECUs are not influenced by the faulty ECU and are able to carry out communications as if there were no faulty ECU. The communication configuration of the CAN communication system is one-to-many communications, that is, communications from an ECU to the other ECUs. Here, there are communications from a normal ECU that normally operates (hereinafter, referred to as communications from a normal ECU) and communications from an ECU connected to a broken communication line (hereinafter, referred to as communications from an abnormal ECU). Because the abnormal ECU is in a bus off state and interrupts data transmission, the transmission error counter of the abnormal ECU does not increase. Because data transmitted from a normal ECU are received by another normal ECU, the transmission error counter of each normal ECU does not increase. In addition, because a normal ECU is able to receive data transmitted from another normal ECU, the reception error counter of each normal ECU does not increase. In addition, because data transmitted from a normal ECU are not received by the abnormal ECU, the reception error counter of the abnormal ECU does not increase. In other words, because the abnormal ECU cannot carry out accuracy data reception, the reception error counter does not increase.

When a normal ECU enters a bus off state, the transmission error counter accumulated value of an abnormal ECU, which is not in a bus off state, increases, and the reception error counter accumulated value thereof does not increase, that is, remains constant. In addition, the transmission and reception error counter accumulated values of a normal ECU, other than the bus-off ECU, increase. This is because the abnormal ECU, which is not in a bus off state, continues to carry out communications and, therefore, the communications interferes with communications of the other ECU. In the CAN communication, the ECU, which transmits data, monitors the CAN communication line 400 at the same time. The ECU determines a situation where a monitoring bit is different from the transmitted bit, as a transmission error. Because the abnormal ECU, which is not in a bus off state, continues communications, data transmitted from the abnormal ECU are transmitted at an abnormal voltage. For this reason, the monitoring bit differs from the transmitted bit. Thus, the transmission error counter of the abnormal ECU increases. In addition, because the abnormal ECU cannot receive data transmitted from another normal ECU, the reception error counter does not increase. In the communications from a normal ECU to the abnormal ECU, at the transmission side, the monitoring bit is different from the transmitted bit due to the influence of the faulty ECU. Thus, the transmission error counter of the normal ECU increases. In addition, the data transmitted from a normal ECU cause a reception error in another normal ECU due to the influence of the abnormal ECU. Thus, the reception error counter of the normal ECU increases.

On the basis of the transmission and reception error counter accumulated values stored in the storage units 106 of all the ECUs 100, while an ECU is in a bus off state, when there is an ECU whose transmission error counter accumulated value increases and whose reception error counter accumulated value does not increase, the CPU 504 estimates that a communication line to that ECU is broken.

In addition, on the basis of the transmission and reception error counter accumulated values stored in the storage units 106 of all the ECUs 100, while an ECU is in a bus off state, when there is no ECU whose transmission error counter accumulated value increases and whose reception error counter accumulated value does not increase, and when the reception error counter accumulated values stored in the storage units 106 of all the ECUs 100 do not increase, the CPU 504 determines that a communication line to the bus-off ECU is broken.

In addition, on the basis of the transmission and reception error counter accumulated values recorded in all the ECUs, while an ECU is in a bus off state, when there is no ECU whose transmission error counter accumulated value increases and whose reception error counter accumulated value does not increase, and when the transmission and reception error counter accumulated values recorded in all the ECUs increase, the CPU 504 determines that it is difficult to identify a fault point.

A fault location method according to the present embodiment will be described.

In the present embodiment, the case described below is such that, as shown in FIG. 3, among the ECUs 100₁ to 100₃ connected to the CAN communication line 400, a one-wire break has occurred in a CAN communication line connected to the ECU 100₃, and then the communication line is currently returned to a normal state. However, this may also be applied to the case in which the number of ECUs that constitute the CAN communication system is two, four or more. In addition, this may also be applied to the case in which two or more ECUs each are connected to a one-wire-broken communication line.

When a one-wire break has occurred in a CAN communication line connected to the ECU 100₃, as shown in FIG. 4, after the one-wire break has occurred in the CAN communication line connected to the ECU 100₃, the ECU 100₃ enters a bus off state prior to the ECUs 100₁ and 100₂. This is because a transmission error frequently occurs due to a one-wire break. After that, the ECU 100₁ and/or the ECU 100₂ enter a bus off state. This is because the data transmitted from the ECU 100₃ that is connected to a one-wire-broken CAN communication line before entering a bus off state influences communications of the ECU 100₁ and/or the ECU 100₂. In the fault location method according to the present embodiment, on the basis of the transmission errors and reception errors detected during times since the ECU 100₃ connected to a one-wire-broken CAN communication line enters a bus off state until the normal ECUs 100₁ and/or 100₂ enter a bus off state, detection of a fault point, that is, detection of a broken point, is performed. As described above, each ECU, which serves as a communication device, changes into a bus off state on the basis of the detected transmission error.

Here, the ECU 100₁ and/or the ECU 100₂ might enter a bus off state prior to the ECU 100₃. In this case, after the bus-off ECU 100₁ and/or ECU 100₂ return from the bus off state, the ECU 100₁ and/or ECU 100₂ naturally initiate communications. However, while the ECUs 100₁ to 100₃ repeatedly enter a bus off state and return from the bus off state, the ECU 100₃ is more likely to enter a bus off state. Under the above situation, detection of a fault point is performed on the basis of the transmission and reception error counter accumulated values.

In addition, in the present embodiment, the process at each ECU and the process of the fault location device 500 will be separately described.

Figure 5:
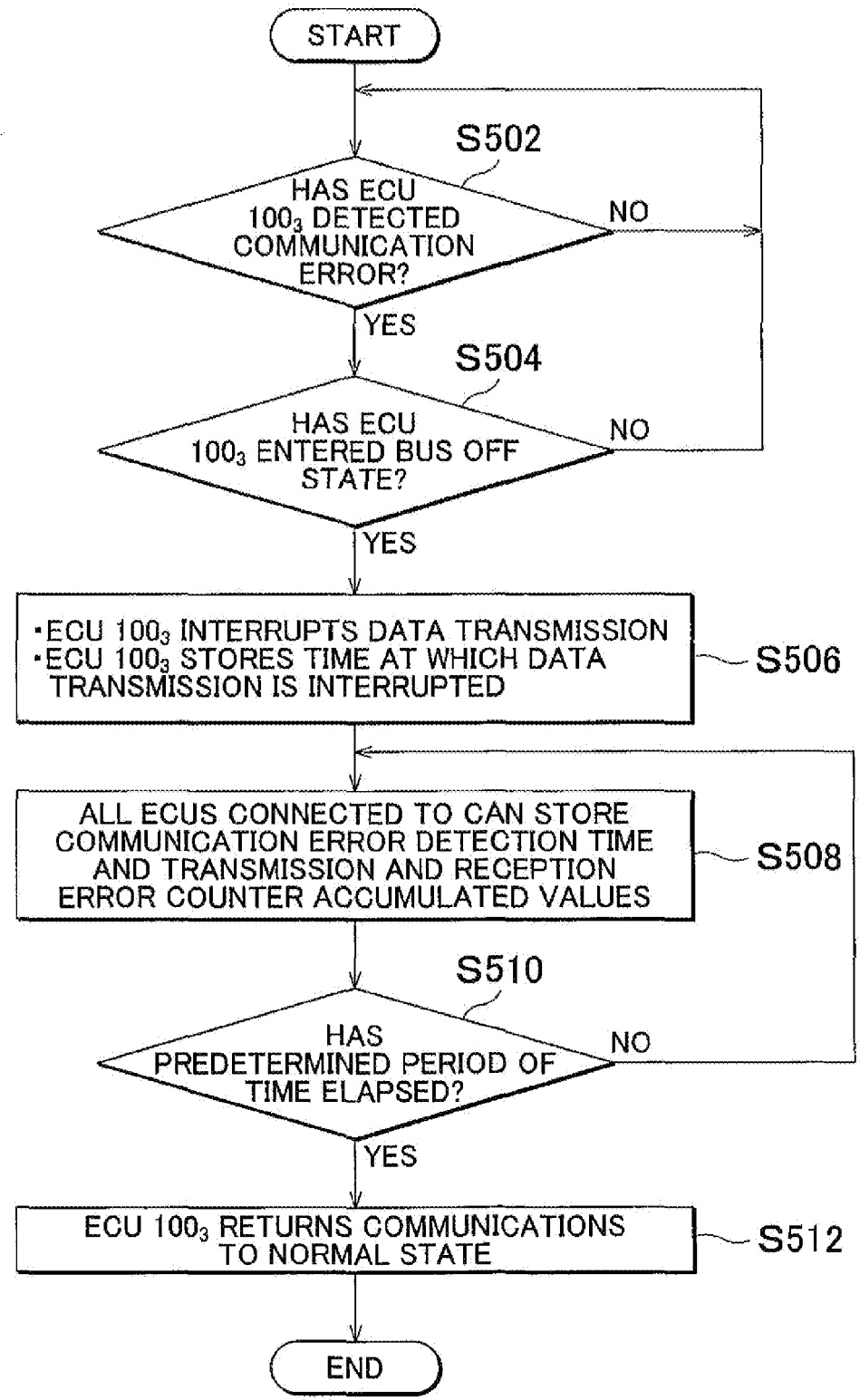
FIG. 5 is a flowchart that shows the operations of a communication device according to the first embodiment of the invention.

The process at each ECU will be described with reference to FIG. 5.

In accordance with the communication protocol of the in-vehicle LAN, ECUs included in the communication system carry out communications. For example, in accordance with the CAN protocol the ECUs included in the CAN communication system carry out communications.

The CPU 102₃ of the ECU 100₃ determines whether a communication error is detected (step S502). For example, the CPU 102₃ of the ECU 100₃ monitors the condition of communications, and detects a transmission error and/or a reception error.

When the communication error is detected (step S502: YES), the CPU 102₃ of the ECU 100₃ obtains the detection time and, in addition, adds the transmission error counter value corresponding to the transmission error and/or the reception error counter value corresponding to the reception error to obtain the transmission error counter accumulated value and/or the reception error counter accumulated value. The detection time, the transmission error counter accumulated value and/or the reception error counter accumulated value are stored in the storage unit 106₃. It may be configured to store the transmission error counter value and/or the reception error counter value. Then, the CPU 102₃ of the ECU 100₃ notifies the other ECUs that an error is detected in order to prevent the other ECUs acquire a message containing an error. For example, the CPU 102₃ transmits an error flag. On the other hand, when no communication error is detected (step S502: NO), the process returns to step S502 and continues to detect a communication error. In this case, the condition of communications is normal, and estimation of a fault point ends.

The CPU 102₃ of the ECU 100₃ determines whether to enter a bus off state (step S504). The CPU 102₃ of the ECU 100₃ determines to enter a bus off state when the transmission error counter accumulated value is larger than or equal to a predetermined transmission error counter accumulated value at which it is assumed to influence communications of the other ECUs 100, and determines not to enter a bus off state when the transmission error counter accumulated value is smaller than the predetermined transmission error counter accumulated value. For example, when the CAN protocol is employed as the communication protocol of the in-vehicle LAN, it is determined to change into a bus off state when the transmission error counter accumulated value is larger than or equal to 256. The ECU that has changed into the bus off state resumes communications when a return condition is satisfied.

The return condition includes the case in which any ECUs do not carry out communications for a predetermined period of time, for example, 2.5 ms.

When it is determined that the ECU $100_3$ is in a bus off state (step S504: YES), the CPU $102_3$ of the ECU $100_3$ interrupts data transmission. This interruption of data transmission continues for a predetermined period of time. Then, the CPU $102_3$ of the ECU $100_3$ stores the time, at which data transmission is interrupted, in the storage unit $106_3$. In this case, ECUs other than the ECU $100_3$ are not notified that the ECU $100_3$ is in a bus off state, so the other ECUs continue to carry out communications. On the other hand, when it is determined that the ECU $100_3$ is not in a bus off state (step S504: NO), the process returns to step S502 and continues to detect a communication error. In this case, the duration of fault is short and, therefore, the ECU $100_3$ does not change into a bus off state. When the CPU 102 of each ECU 100 is detected a communication error, the CPU 102 stores the detection time of the communication error in the storage unit 106. In addition, the CPU 102 of each ECU 100, on the basis of whether the communication error is a transmission error or a reception error, obtains a transmission error counter value and/or a reception error counter value, and adds the transmission error counter value and/or the reception error counter value to the transmission error counter accumulated value and/or the reception error counter accumulated value, and then stores the resultant transmission error counter accumulated value and/or the resultant reception error counter accumulated value in the storage unit 106 (step S508). For example, an ECU that has detected a communication error (reception error) transmits an error frame. The error frame is received by the other ECUs included in the CAN communication system As a result, the ECUs, other than the ECU that has detected the communication error, each increase the reception error counter accumulated value. The ECUs that have received the error frame increase only the reception error counter accumulated value and do not increase the transmission error counter accumulated value. An ECU whose transmission message causes an error increases the transmission error counter accumulated value. Each ECU stores the transmission error counter accumulated value, the reception error counter accumulated value, time at which the transmission error counter accumulated value varies, and time at which the reception error counter accumulated value varies, in the storage unit 106. In addition, it may be configured to store the transmission error counter value and/or the reception error counter value.

The CPU $102_3$ of the ECU $100_3$ determines whether a predetermined period of time has elapsed since it enters a bus off state (step S510). For example, the predetermined period of time may be set to a period of time that allows accumulation of some transmission and reception error counter values to make it possible to determine an abnormal ECU. For example, about several minutes may be set to the predetermined period of time.

When it is determined that the predetermined period of time has not elapsed (step S510: NO), the process returns to step S508 and continues to detect a communication error. On the other hand, when it is determined that the predetermined period of time has elapsed (step S510: YES), the CPU $102_3$ of the ECU $100_3$ returns communications to a normal state. For example, data transmission is initiated.

Figure 6:
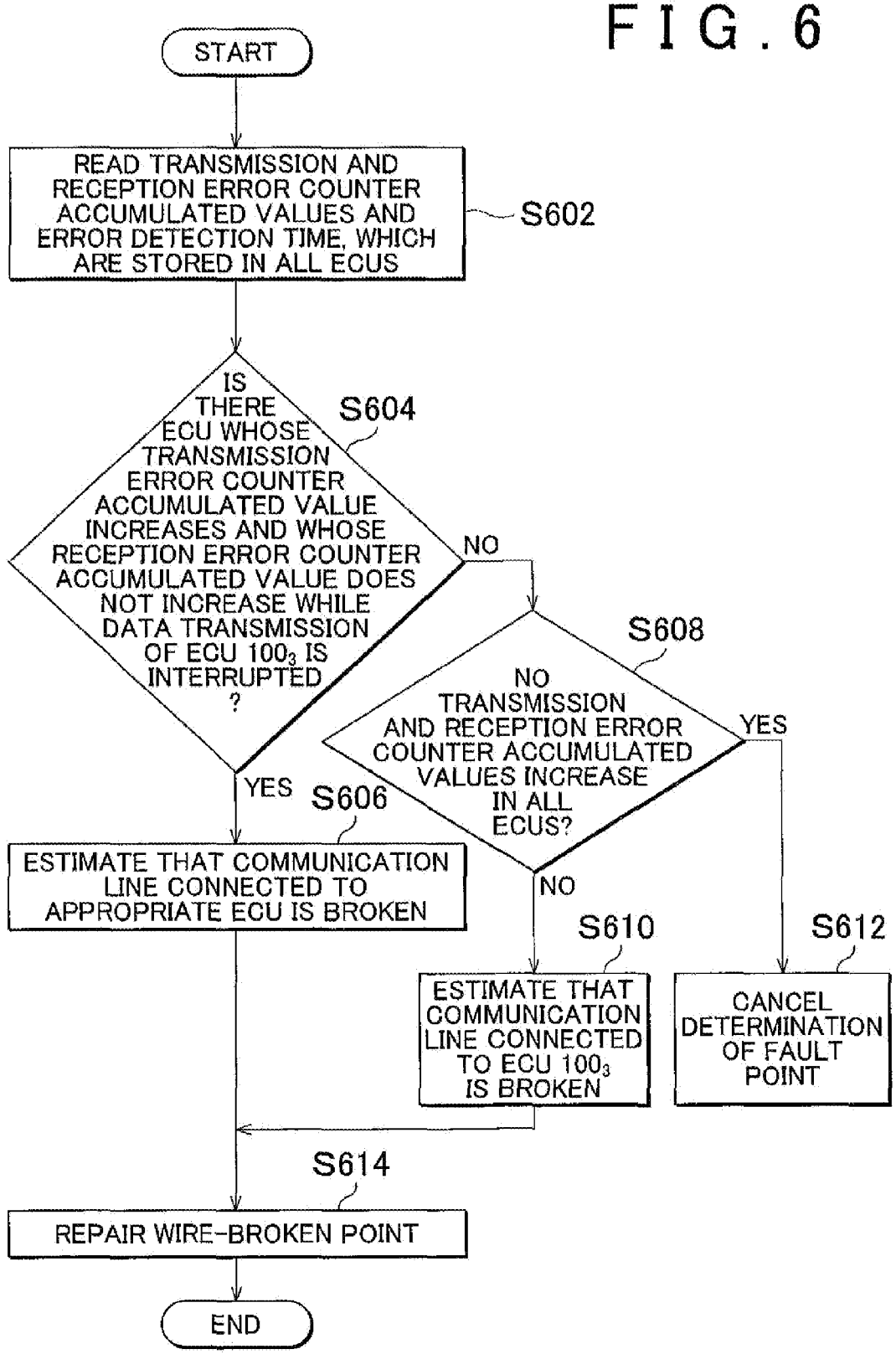
FIG. 6 is a flowchart that shows the operations of the fault location device according to the first embodiment of the invention.

The process of the fault location device 500 will be described with reference to FIG. 6. The fault location device 500 is connected to the CAN communication system 1000 through the DLC 450.

The CPU 504 reads the transmission and reception error counter accumulated values, stored in the storage units 106 of all the ECUs, and the error detection time (step S602).

The CPU 504 determines whether there is an ECU whose transmission error counter accumulated value increases and whose reception error counter accumulated value does not increase while data transmission of the ECU $100_3$ is interrupted, that is, while the ECU $100_3$ is in a bus off state (step S604).

When the appropriate ECU is present (step S604: YES), the CPU 504 estimates that a communication line to the appropriate ECU is broken (step S606). Because an ECU connected to a one-wire-broken communication line is not able to detect that a message is transmitted from the other ECUs, the transmission error counter accumulated value increases, whereas the reception error counter accumulated value does not increase, while the ECU $100_3$ is in a bus off state. Thus, when such an ECU is present, it may be estimated that a communication line to that ECU is broken.

On the other hand, when there is no appropriate ECU (step S604: NO), the CPU 504 determines whether no transmission and reception error counter values increase in all the ECUs (step 608). When no transmission and reception error counter values increase in all the ECUs (step S608: NO), the CPU 504 estimates that a communication line to the ECU $100_3$ is broken (step S610). That is, when no communication error occurs while the ECU $100_3$ is in a bus off state, it may be estimated that a communication line to the ECU $100_3$ is broken. On the other hand, when there is an ECU whose transmission or reception error counter value increases (step S608: YES), the CPU 504 determines that it is difficult to estimate a fault point, and cancels determination of the fault location (step S612). In this case, it is assumed that the ECU $100_3$ returns from a bus off state to a normal state for a short period of time or a designed period of time during which the ECU $100_3$ changes into a bus off state is short.

The wire-broken point is repaired (step S614).

According to the present embodiment, even when a one-wire break had occurred in the CAN communication line in the past and the CAN communication line is currently returned to a normal state, it is possible to identify a wire-broken point.

A CAN communication system according to a second embodiment of the invention will be described.

The configuration of the CAN communication system according to the second embodiment is similar to the configuration described with reference to FIG. 1.

In the fault location device 500 according to the second embodiment, on the basis of the transmission and reception error counter accumulated values recorded in all the ECUs, while an ECU is in a bus off state, when there is an ECU whose transmission error counter accumulated value increases and whose reception error counter accumulated value does not increase, the CPU 504 estimates that a communication line to that ECU is broken.

In addition, on the basis of the transmission and reception error counter accumulated values recorded in all the ECUs, while an ECU is in a bus off state, when there is an ECU whose transmission error counter accumulated value does not increase and whose reception error counter accumulated value does not increase, and when the transmission and reception error counter accumulated values recorded in all the ECUs do not increase, the CPU 504 determines that a communication line to the bus-off ECU is broken.

In addition, on the basis of the transmission and reception error counter accumulated values recorded in all the ECUs, while an ECU is in a bus off state, when there is no ECU whose transmission error counter accumulated value increases and there is no ECU whose reception error counter accumulated value does not increase, the CPU 504 determines that it is difficult to identify a fault location. That is, when the transmission error counter accumulated values recorded in all the ECUs do not increase and the reception error counter accumulated values recorded in all the ECUs increase, the CPU 504 determines that it is difficult to identify a fault location.

In addition, on the basis of the transmission and reception error counter accumulated values recorded in all the ECUs, while an ECU is in a bus off state, when there is no ECU whose transmission error counter accumulated value does not increase and there is no ECU whose reception error counter accumulated value does not increase, the CPU 504 determines that it is difficult to identify a fault point. That is, when the transmission and reception error counter accumulated values recorded in all the ECUs increase, the CPU 504 determines that it is difficult to identify a fault point.

A fault location method according to the present embodiment will be described.

In the present embodiment, the case similar to the above described embodiment will be described.

The process at each ECU is similar to the process described with reference to FIG. 5.

Figure 7:
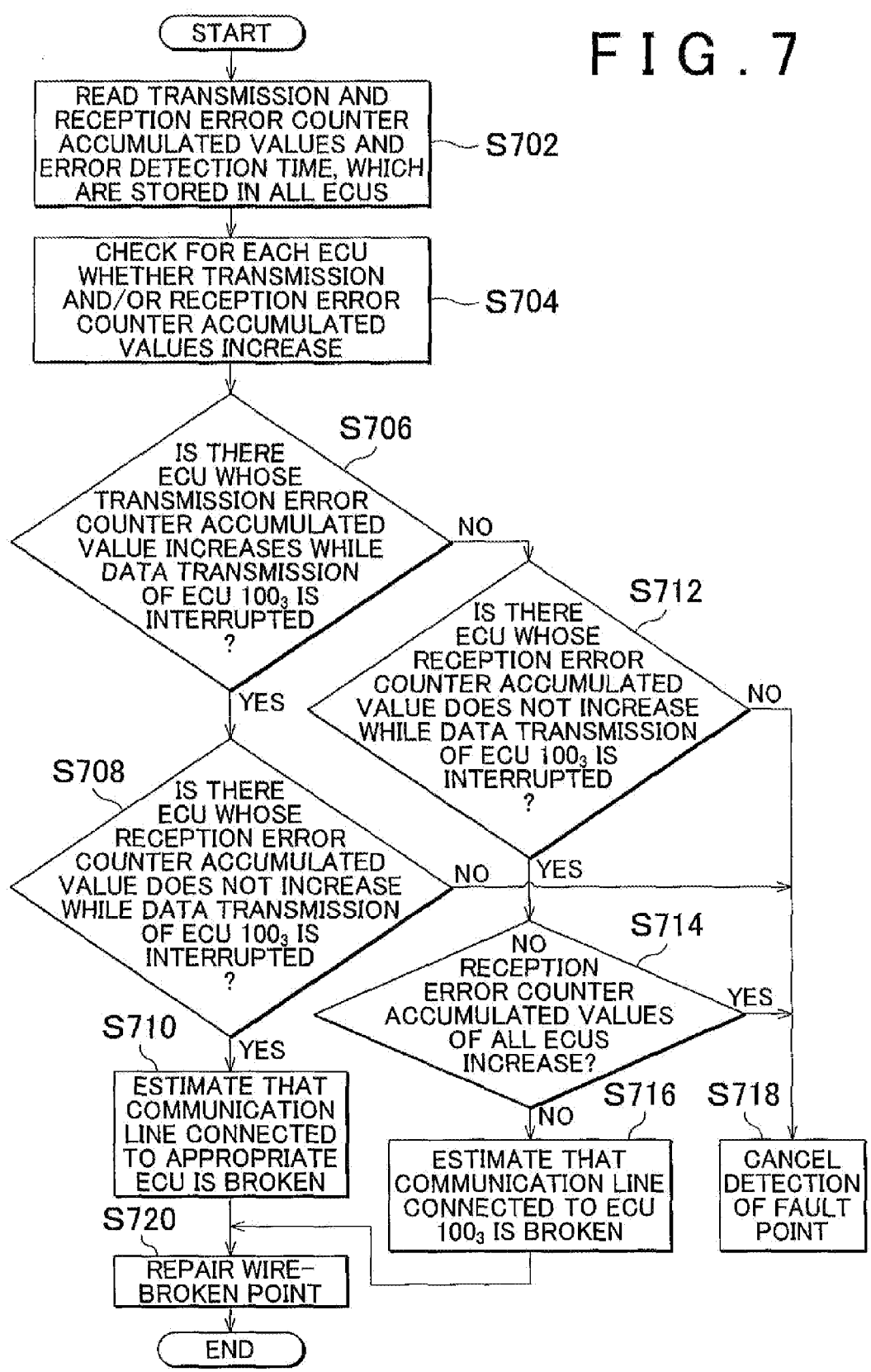
FIG. 7 is a flowchart that shows the operations of the fault location device according to a second embodiment of the invention.

The process of the fault location device 500 will be described with reference to FIG. 7. The fault location device 500 is connected to the CAN communication system 1000 through the DLC 450.

The CPU 504 reads the transmission and reception error counter accumulated values, stored in the storage units 106 of all the ECUs, and the error detection time (step S702).

The CPU 504 checks for each ECU whether the transmission error counter accumulated value and/or the reception error counter accumulated value increase (step S704).

The CPU 504 determines whether there is an ECU whose transmission error counter accumulated value increases while data transmission of the ECU 100$_3$ is interrupted, that is, while the ECU 100$_3$ is in a bus off state (step S706).

When there is an ECU whose transmission error counter accumulated value increases while data transmission of the ECU 100$_3$ is interrupted (step S706: YES), the CPU 504 determines whether there is an ECU whose reception error counter accumulated value does not increase while data transmission of the ECU 100$_3$ is interrupted (step S708).

When the appropriate ECU is present (step S708: YES), the CPU 504 estimates that a communication line to the appropriate ECU is broken (step S710).

On the other hand, in step S706, when there is no ECU whose transmission error counter accumulated value increases while data transmission of the ECU 100$_3$ is interrupted (step S706: NO), the CPU 504 determines whether there is an ECU whose reception error counter accumulated value does not increase while data transmission of the ECU 100$_3$ is interrupted (step S712).

When there is an ECU whose reception error counter accumulated value does not increase while data transmission of the ECU 100$_3$ is interrupted (step S712: YES), the CPU 504 determines whether no reception error counter accumulated values of all the ECUs increase (step S714).

When no reception error counter accumulated values of all the ECUs increase (step S714: NO), the CPU 504 determines that a communication line to the ECU 100$_3$ is broken (step S716).

On the other hand, when, in step S712, there is no ECU whose reception error counter accumulated value does not increase while data transmission of the ECU 100$_3$ is interrupted (step S712: NO), when, in step S708, there is no appropriate ECU (step S708: NO), or when, in step S714, there is an ECU whose reception error counter accumulated value increases (step S714: YES), the CPU 504 determines that it is difficult to identify a fault point and cancels the detection of a fault point (step S718). In this case, it is assumed that the ECU 100$_3$ returns from a bus off state to a normal state for a short period of time or a designed period of time during which the ECU 100$_3$ changes into a bus off state is short.

In step S710 and/or in step S716, the identified broken communication line is repaired (step S720).

According to the present embodiment, even when a one-wire break had occurred in the CAN communication line in the past and the CAN communication line is currently returned to a normal state, it is possible to identify a broken point.

A CAN communication system according to a third embodiment of the invention will be described.

Figure 8:
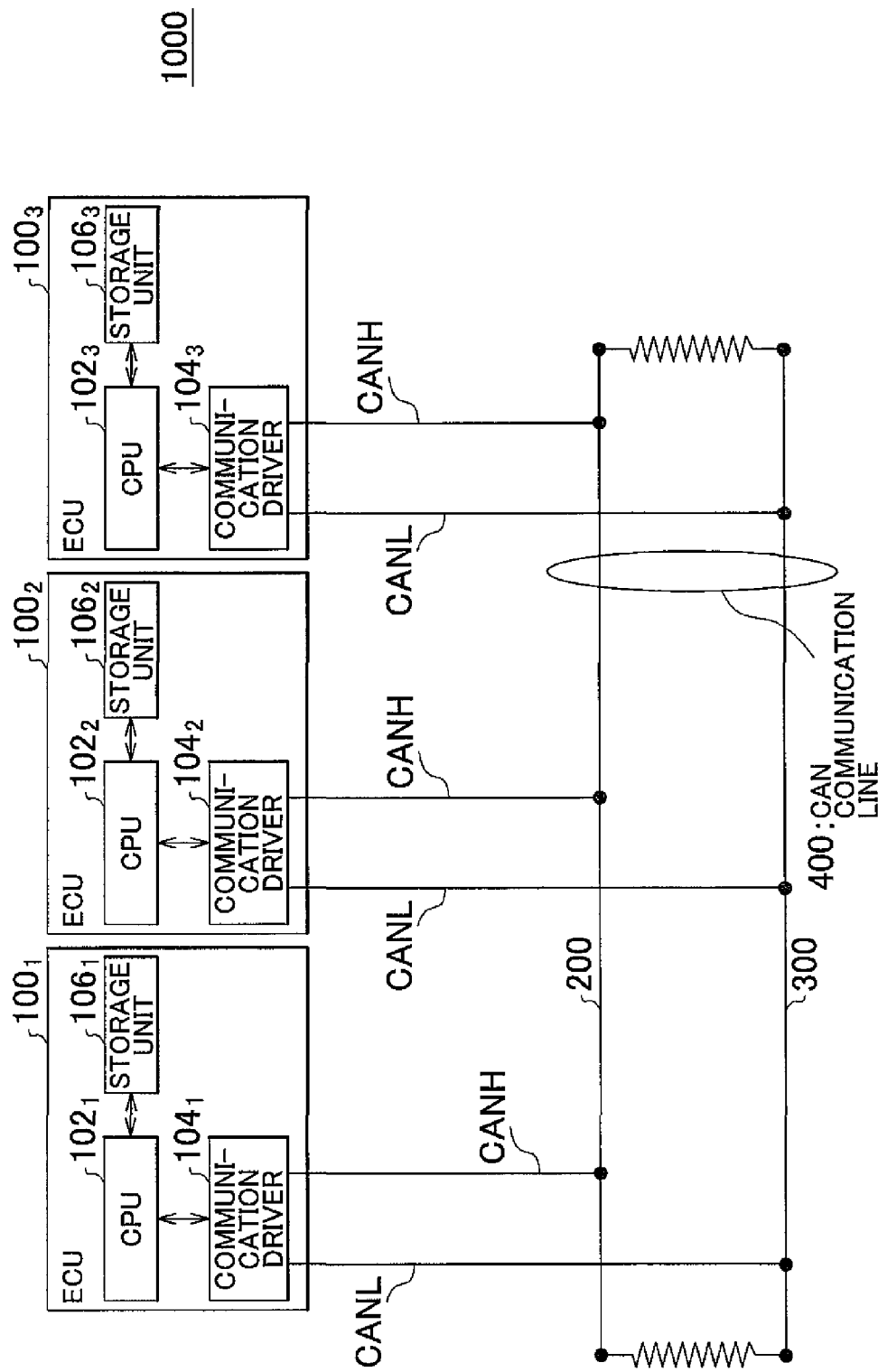
FIG. 8 is a view that illustrates the CAN communication system according to a third embodiment of the invention.

The configuration of the CAN communication system according to the third embodiment differs from the above described embodiments in that, as shown in FIG. 8, the functions of the fault location device that identifies a fault point are incorporated into the ECU.

In the present embodiment, the case in which the functions of the fault location device are incorporated into the ECU 100$_1$ will be described. This ECU may be configured as a master ECU.

The CPU 102$_2$ and CPU 102$_3$ of the other ECUs 100$_2$ and 100$_3$, when communications returns to a normal state, transmit the transmission and reception error counter accumulated values and the error detection time to the ECU 100$_1$ through the CAN communication line 400. The transmission timing may be a regular transmission timing of each ECU or the transmission may be performed so that the ECU 100$_1$ inquires the transmission of each ECU and then the ECU that has received the inquiry responds to the inquiry.

The ECU 100$_1$ estimates an ECU, which is connected to a one-wire broken communication line, by a method similar to the above described method on the basis of the transmission and reception error counter accumulated values and the error detection time, transmitted from the other ECUs. The CPU 102$_1$ of the ECU 100$_1$ records the estimated ECU in the storage unit 106.

By reading the information, regarding the ECU connected to a one-wire broken communication line, stored in the storage unit 106 of the ECU 100$_1$ from the outside of the vehicle, it is possible to acquire the information regarding the estimated fault point.

A fault location method according to the third embodiment will be described.

In the present embodiment, the case similar to the above described embodiments will be described.

The process at each ECU is similar to the process described with reference to FIG. 5.

The process of the master ECU 100$_1$ further includes the process described with reference to FIG. 6 or FIG. 7 in addition to the process described with reference to FIG. 5.

In addition, the information regarding the estimated ECU may be displayed on the screen of a meter or a navigation system. By so doing, without any extra reading device, it is possible to indicate the estimated fault point.

In the present embodiment, the CPUs 102$_2$ and 102$_3$ of the other ECUs 100$_2$ and 100$_3$ transmit the transmission and reception error counter accumulated values and the error detection time to the ECU 100$_1$ through the CAN communication line 400 when communications returns to a normal state. Instead, it is also applicable that an exclusive line connected to the ECU $100_1$ is provided and the transmission and reception error counter accumulated values and the error detection time are transmitted through the exclusive line. By so doing, without influencing communications among the ECUs, it is possible to transmit the transmission and reception error counter accumulated values and the error detection time to the ECU $100_1$.

According to the present embodiment, even when a one-wire break had occurred in the CAN communication line in the past and the CAN communication line is currently returned to a normal state, it is possible to identify a wire-broken point without providing a fault location device.

For the sake of convenience of description, specific numeric values are illustrated to easily understand the invention; however, unless otherwise stated, those numeric values are simply illustrative and any appropriate values may be used.

The aspects of the invention are described with reference to the specific embodiments; these embodiments are simply illustrative. A person skilled in the art will understand various alternative embodiments, modifications, substitutes, replacements, and the like. For the sake of convenience of description, the devices according to the embodiments of the invention are described with reference to the functional block diagrams. Those devices may be implemented by hardware, software, or a combination of them.

What is claimed is:

1. A fault location device that is connected to first and second communication devices that carry out communications between each other through a two-wire communication line, each of the first and second communication devices being connected to the two-wire communication line by a respective pair of communication lines, the fault location device comprising:
   a central processor;
   an acquisition unit; and
   a detection unit,
   wherein, if a communication error is detected, then each of the first and second communication devices:
      stores a time of the communication error and a communication error counter accumulated value that indicates accumulated counts corresponding to the communication error,
      changes into a bus off state on the basis of the communication error counter accumulated value, and
      after a predetermined period of time has elapsed, returns from the bus off state,
   wherein the acquisition unit acquires, using the central processor, the time of the communication error and the communication error counter accumulated value, which are stored in each of the first and second communication devices, and
   wherein the detection unit detects, using the central processor, that one communication line, from one of the respective pairs of communication lines is broken, but the other communication line from the one of the respective pairs of communication lines is not broken, on the basis of variations in the communication error counter accumulated values while any one of the first and second communication devices is in a bus off state.

2. The fault location device according to claim 1, wherein the communication error includes a transmission error and a reception error,
   wherein each of the first and second communication devices stores a transmission error counter accumulated value that indicates accumulated counts corresponding to the transmission error and a reception error counter accumulated value that indicates accumulated counts corresponding to the reception error, and
   wherein if there is a communication device, from among the first and second communication devices, whose transmission error counter accumulated value increases and whose reception error counter accumulated value does not increase, then the detection unit determines that one communication line, from the respective pair of communication lines connected to that communication device is broken, but the other communication line from the respective pair of communication lines connected to that communication device is not broken.

3. The fault location device according to claim 1, wherein the communication error includes a transmission error and a reception error,
   wherein each of the first and second communication devices stores a transmission error counter accumulated value that indicates accumulated counts corresponding to the transmission error and a reception error counter accumulated value that indicates accumulated counts corresponding to the reception error, and
   wherein if there is no communication device, from among the first and second communication devices, whose transmission error counter accumulated value increases, and if the reception error counter accumulated values of all the first and second communication devices do not increase, then the detection unit determines that one communication line, from the respective pair of communication lines connected to the communication device which is in the bus off state is broken, but the other communication line from the respective pair of communication lines connected to the communication device which is in the bus off state is not broken.

4. The fault location device according to claim 1, wherein if the first communication device is in a bus off state, then the first communication device only performs reception of communications from the second communication device.

5. A first communication device in a communication system formed of the first communication device and a second communication device, wherein the first communication device and the second communication device carry out communications between each other through a two-wire communication line, each of the first and second communication devices being connected to the two-wire communication line by a respective pair of communication lines, wherein the first communication device comprises:
   a central processor;
   a storage unit that stores, using the central processor, a time of a communication error and a communication error counter accumulated value that indicates accumulated counts corresponding to the communication error;
   a control unit that changes, using the central processor, the first communication device into a bus off state on the basis of the error counter accumulated value and then, after a predetermined period of time has elapsed, returns the first communication device from the bus off state;
   an acquisition unit that acquires, using the central processor, the time of the communication error and the communication error counter accumulated value, which are stored in each of the first and second communication devices; and
   a detection unit that detects, using the central processor, that one communication line, from one of the respective pairs of communication lines is broken, but the other communication line from the one of the respective pairs of communication lines is not broken, on the basis of variations in the communication error counter accumulated values while one of the first and second communication devices is in a bus off state.

6. The first communication device according to claim 5, wherein the communication error includes a transmission error and a reception error,
wherein the storage unit stores a transmission error counter accumulated value that indicates accumulated counts corresponding to the transmission error and a reception error counter accumulated value that indicates accumulated counts corresponding to the reception error, and
wherein if there is a communication device, from among the first and second communication devices, whose transmission error counter accumulated value increases and whose reception error counter accumulated value does not increase, then the detection unit determines that one communication line, from the respective pair of communication lines connected to that communication device is broken, but the other communication line from the respective pair of communication lines connected to that communication device is not broken.

7. The first communication device according to claim 5, wherein the communication error includes a transmission error and a reception error,
wherein the storage unit stores a transmission error counter accumulated value that indicates accumulated counts corresponding to the transmission error and a reception error counter accumulated value that indicates accumulated counts corresponding to the reception error, and
wherein if there is no communication device, from among the first and second communication devices, whose transmission error counter accumulated value increases, and if the reception error counter accumulated values of all the first and second communication devices do not increase, then the detection unit determines that one communication line, from the respective pair of communication lines connected to the communication device which is in the bus off state is broken, but the other communication line from the respective pair of communication lines connected to the communication device which is in the bus off state is not broken.

8. The first communication device according to claim 5, wherein if the first communication device is in a bus off state, then the first communication device only performs reception of communications from the second communication device.

9. A fault location method for detecting a communication device connected to a broken communication line from among first and second communication devices that carry out communications between each other through a two-wire communication line, each of the first and second communication devices being connected to the two-wire communication line by a respective pair of communication lines, the fault location method comprising:
if a communication error has been detected by the first communication device, then storing a time of the communication error and a communication error counter accumulated value that indicates accumulated counts corresponding to the communication error;
changing the first communication device into a bus off state on the basis of the communication error counter accumulated value and then, after a predetermined period of time has elapsed, returning the first communication device from the bus off state;
acquiring the time of the communication error and the communication error counter accumulated value, which are stored in each of the first and second communication devices; and
detecting that one communication line, from one of the respective pairs of communication lines is broken, but the other communication line from the one of the respective pairs of communication lines is not broken, on the basis of variations in the communication error counter accumulated values of the first and second communication devices while one of the first and second communication devices is in a bus off state.

10. The fault location method according to claim 9, wherein the communication error includes a transmission error and a reception error,
wherein if the time of the communication error and the communication error counter accumulated value are stored, then a transmission error counter accumulated value that indicates accumulated counts corresponding to the transmission error and a reception error counter accumulated value that indicates accumulated counts corresponding to the reception error are stored; and
wherein if there is a communication device, from among the first and second communication devices, whose transmission error counter accumulated value increases and whose reception error counter accumulated value does not increase, then it is determined that a one communication line, from the respective pair of communication lines connected to that communication device is broken, but the other communication line from the respective pair of communication lines connected to that communication device is not broken.

11. The fault location method according to claim 9, wherein the communication error includes a transmission error and a reception error,
wherein if the time of the communication error and the communication error counter accumulated value are stored, then a transmission error counter accumulated value that indicates accumulated counts corresponding to the transmission error and a reception error counter accumulated value that indicates accumulated counts corresponding to the reception error are stored; and
wherein if there is no communication device, from among the first and second communication devices, whose transmission error counter accumulated value increases and if the reception error counter accumulated values of all the first and second communication devices do not increase, then it is determined that one communication line, from the respective pair of communication lines connected to the communication device which is in the bus off state is broken, but the other communication line from the respective pair of communication lines connected to the communication device which is in the bus off state is not broken.

12. A non-transitory computer-readable storage medium storing instructions for causing at least one processor to execute a fault location method for detecting a communication device connected to a broken communication line from among first and second communication devices that carry out communications between each other through a two-wire communication line, each of the first and second communication devices being connected to the two-wire communication line by a respective pair of communication lines, the fault location method comprising:
if a communication error has been detected by the first communication device, then storing, by the at least one processor, a time of the communication error and a communication error counter accumulated value that indicates accumulated counts corresponding to the communication error;

changing, by the at least one processor, the first communication device into a bus off state on the basis of the communication error counter accumulated value and then, after a predetermined period of time has elapsed, returning, by the at least one processor, the first communication device from the bus off state;

acquiring, by the at least one processor, the time of the communication error and the communication error counter accumulated value, which are stored in each of the first and second communication devices; and detecting, by the at least one processor, that one communication line, from one of the respective pairs of communication lines is broken, but the other communication line from the one of the respective pairs of communication lines is not broken, on the basis of variations in the communication error counter accumulated values of the first and second communication devices while one of the first and second communication devices is in a bus off state.

* * * * *